V. M. HARP'S.
CHARGING STORAGE BATTERIES.
APPLICATION FILED AUG. 24, 1912.
1,205,620.
Patented Nov. 21, 1916.
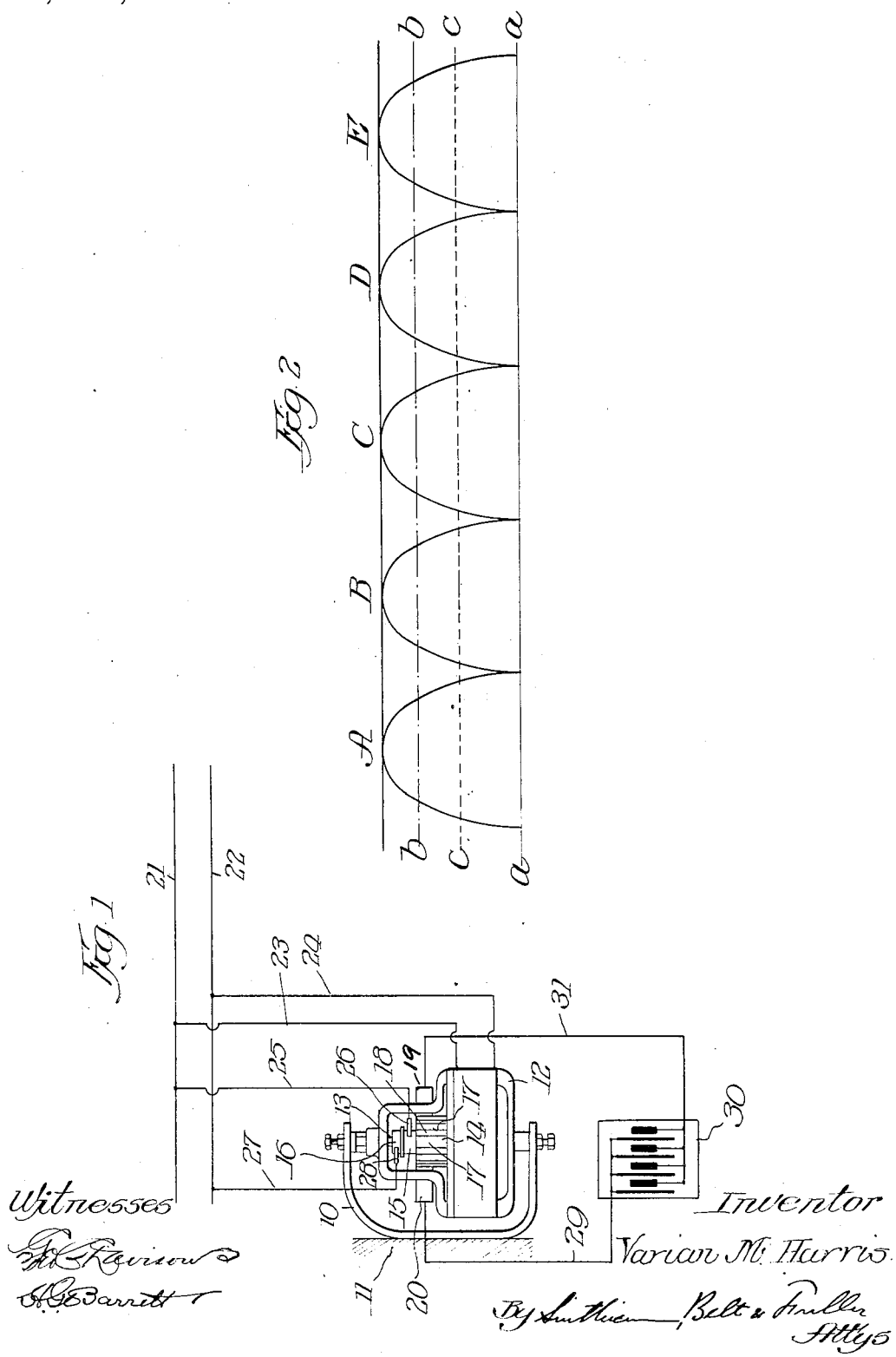

UNITED STATES PATENT OFFICE.

VARIAN M. HARRIS, OF CHICAGO, ILLINOIS, ASSIGNOR TO HENRY S. HAWLEY, TRUSTEE, OF CHICAGO, ILLINOIS.

CHARGING STORAGE BATTERIES.

1,205,620.  Specification of Letters Patent.  Patented Nov. 21, 1916.

Application filed August 24, 1912. Serial No. 716,808.

*To all whom it may concern:*

Be it known that I, VARIAN M. HARRIS, a citizen of the United States, residing at Chicago, in the county of Cook and State of Illinois, have invented certain new and useful Improvements in Charging Storage Batteries, of which the following is a specification.

My invention relates to the charging of storage batteries, and is concerned particularly with a process and means for compensating for the electrolytic lag when a pulsating unidirectional current is used for charging the battery.

In my co-pending application, Serial No. 716,807, filed August 24, 1912, I have described a rectifier which converts an alternating current into a pulsating unidirectional current. Each of the phase waves of the unidirectional current is interrupted when the brushes of the commutator pass from a conducting segment to the non-conducting material which lies between the segments.

In the charging of a storage battery I have discovered that an appreciable time element is necessary for the chemical reactions to take place within the battery, and for this reason if a phase wave is cut at the points which correspond in voltage to the voltage of the battery, the latter will not be charged, since it does not respond instantaneously to the current which passes into it, and sparking will result. In order to overcome this difficulty, I have found that the phase waves should be cut at appropriate points so that the rectified current passes to the battery at a voltage considerably below the normal voltage of the battery. The chemical changes immediately begin to take place in the battery, and by thus allowing the current to flow to the battery at a decreased voltage, the chemical changes have become sufficiently started so that when the voltage of the rectified current reaches the normal voltage of the battery the rectified current is allowed to flow to the battery. I accomplish this result by constructing the segments of my rectifier of such a width that the phase waves of the rectified current are cut at a voltage sufficiently below the normal voltage of the battery so that the time when the voltage of the rectified current is increasing up to the voltage of the battery is sufficient to overcome the electrolytic lag of the latter. These and other advantages of my invention will be more readily understood by reference to the accompanying drawings, which show means for operating my improved method for charging storage batteries, and in which—

Figure 1 is a diagrammatic representation of a mechanical rectifier and a storage battery connected therewith; and Fig. 2 is a diagram representing the unidirectional phase waves of the rectified current and showing the points at which these phase waves are cut.

In carrying out my invention I employ a mechanical rectifier such as is described in my co-pending application, Serial No. 716,807, filed August 24, 1912, but which may be of any other suitable type. As shown in Fig. 1, the rectifier is supported between the ends of a bracket 10, which is attached to a panel 11. The field 12 of the rectifier is freely oscillatory in order to adjust itself to fluctuations in the main current. This feature, however, forms no part of my present invention. Mounted on the rotor shaft 13 is the commutator 14 and the slip rings 15 and 16. The slip rings 15 and 16 are connected with alternate segments 17 of the commutator 14, the insulating spaces 18 occurring between the segments 17. The commutator 14 is engaged by the brushes 19 and 20.

Connected with the conductors 21 and 22 leading from a main source of alternating current are the conductors 23 and 24 leading to the coils of the field 12 of the rectifier. It is by means of the current coming through the conductors 23 and 24 that the rotor of the rectifier is operated. The conductor 25 leads from the main conductor 21 to the brush 26 engaging the slip ring 15, and the conductor 27 leads from the conductor 22 to the brush 28 engaging the slip ring 16. The conductor 29 leads from the brush 20 to one pole of the storage battery 30, while the conductor 31 leads from the brush 19 to the opposite pole of the battery 30.

As the rotor of the rectifier revolves, the alternating current passing from the main lines 21 and 22 through the conductors 25 and 27, respectively, is converted into a pulsating unidirectional current by the action of the commutator 14, so that all of the phase waves passing through the conductor 29 to the storage battery 30 are of one polarity, and all of the phase waves passing through the conductor 31 are of the opposite polarity. These phase waves are diagrammatically represented in Fig. 2. From the base line, a, a the phase waves extend from their neutral points to their peaks or points of maximum voltage, the successive waves being represented by the sine curves, A, B, C, D and E, respectively.

Now let us assume that the voltage of the battery 30 is 70 volts. In other words, we shall have an electromotive force of 70 volts working counter to the electromotive force of the current coming from the rectifier through the conductors 29 and 31. If the chemical changes within the battery 30 could take place instantaneously, it will be evident that the phase waves A, B, C, D and E should be cut at points corresponding to the voltage of the battery 30—that is, at 70 volts, as shown by the line b, b of Fig. 2. The current passing to the battery 30 would then vary in voltage from 70 volts to the voltage represented by the peaks of the sine curves, which we will regard, for the sake of illustration, as 110 volts, and the battery would thereby be charged.

I have found, however, that the chemical changes within the storage battery do not take place instantaneously, and if the phase waves are cut in a position represented by the line b, b, considerable sparking results at the commutator 14 and the battery 30 is not charged, since by the time the chemical changes have taken place the brushes 19 and 20 are no longer in contact with the conducting segments of the commutator. In order to accomplish the desired results, it is therefore necessary to cut the phase waves A, B, C, D and E at points at which the voltage is considerably below the normal voltage of the battery, such points being diagrammatically represented where the line c, c of Fig. 2 cuts the phase waves. The chemical changes within the battery begin to take place immediately, and by the time the voltage of any particular phase wave has increased to the normal voltage of the battery—that is, for example, to 70 volts, the battery is in condition to receive the charge, and, similarly, the phase wave is not again cut on the side on which its voltage is decreasing until it is at a point considerably below the normal voltage of the battery 30. In this way I have found that a battery may be efficiently charged without any sparking at the commutator 14.

It will be apparent that considerable change could be made in the manner of carrying out my invention without departing from the spirit or scope thereof.

What I claim is:

1. The method of charging storage batteries from an electric current having phase waves, which consists in interrupting said current in the portions of said waves below a predetermined voltage, said predetermined voltage being sufficiently below the mean counter-electromotive force of said battery to compensate for the electrolytic lag thereof, substantially as described.

2. The method of charging storage batteries from a source of alternating current, which consists in converting said alternating current into unidirectional pulsating current having phase waves and interrupting said current in the portions of said waves below a predetermined voltage, said predetermined voltage being sufficiently below the mean counter-electromotive force of said battery to compensate for the electrolytic lag thereof, substantially as described.

VARIAN M. HARRIS.

Witnesses:
 HENRY M. HUXLEY,
 L. E. HANNEN.